UNITED STATES PATENT OFFICE.

HENRY W. BRADLEY, OF PLAINFIELD, NEW JERSEY.

IMPROVEMENT IN SHORTENING FOR CULINARY USES.

Specification forming part of Letters Patent No. 120,026, dated October 17, 1871; antedated October 3, 1871.

*To all whom it may concern:*

Be it known that I, HENRY W. BRADLEY, of Plainfield, in the county of Union, in the State of New Jersey, have invented a new and useful Process or Improvement in the Manufacture of Shortening from Cotton-Seed Oil for Culinary Use.

Heretofore shortening in culinary use has been confined to hog's lard and butter, while cotton-seed oil was not used for such purpose by reason of its offensive taste and smell, thus rejecting as useless this abundant and rich oil for shortening.

The object of my invention is to deodorize and render palatable cotton-seed oil for culinary use; and I do hereby declare that the following is a full and exact description thereof.

Into any suitable vessel for heating I place cotton-seed oil and water for the purpose of washing, purifying, or deodorizing the oil. For each gallon of oil I use one ounce chlorate of potash and nitre. I then introduce a jet of steam by means of a pipe leading from an ordinary steam-boiler, and heat and agitate for three hours. The steam is then removed and the oil and water allowed to separate. The oil is then drawn into another vessel and heated to a proper degree or to 400° Fahrenheit. While thus heated I infuse the same with oxygen. An economical plan is to heat the peroxide of manganese strongly in an iron retort in a reveberatory furnace. One pound of good oxide of manganese will yield seven gallons of oxygen with some carbonic acid. This last is removed by passing the gas through a wash-bottle containing a solution of potash, which absorbs carbonic acid. The oxygen is then passed into the oil through a suitable pipe. The heat and oxygen deodorize and oxygenate the oil, making it sweet and palatable for culinary use.

I do not intend to confine myself to this process alone, as other methods of producing oxygen may be used.

My improved shortening is put up in cans or other suitable packages in an unctious or oleaginous state. I also prepare it to the consistency of common lard by adding to the oil equal parts, weight, suet, (tallow.) My shortening is also found to be a pepastic and alterative when used in diet.

Having thus described my improvements in the manufacturing of shortening from cotton-seed oil, what I claim therein as my invention, and desire to secure by Letters Patent, is—

1. The improved process for rendering cotton-seed oil suitable for culinary use, the same consisting in subjecting the oil to heat and oxidizing chemical substances, substantially as described.

2. The new article of manufacture consisting of cotton-seed oil treated so as to be suitable for culinary use.

3. The new compound for shortening or other culinary use, consisting of deodorized cotton-seed oil and suet, or other suitable fat.

H. W. BRADLEY.

Witnesses:
 F. S. RUNYON,
 NELSON RUNYON. (35)